Aug. 18, 1936.  E. K. MORGAN  2,051,052
MACHINE TOOL HYDRAULIC CONTROL SYSTEM
Filed Dec. 29, 1927  3 Sheets-Sheet 1

Inventor:
Everette K. Morgan
By
Wilson + McCanna
Attys.

Aug. 18, 1936.  E. K. MORGAN  2,051,052
MACHINE TOOL HYDRAULIC CONTROL SYSTEM
Filed Dec. 29, 1927  3 Sheets-Sheet 2
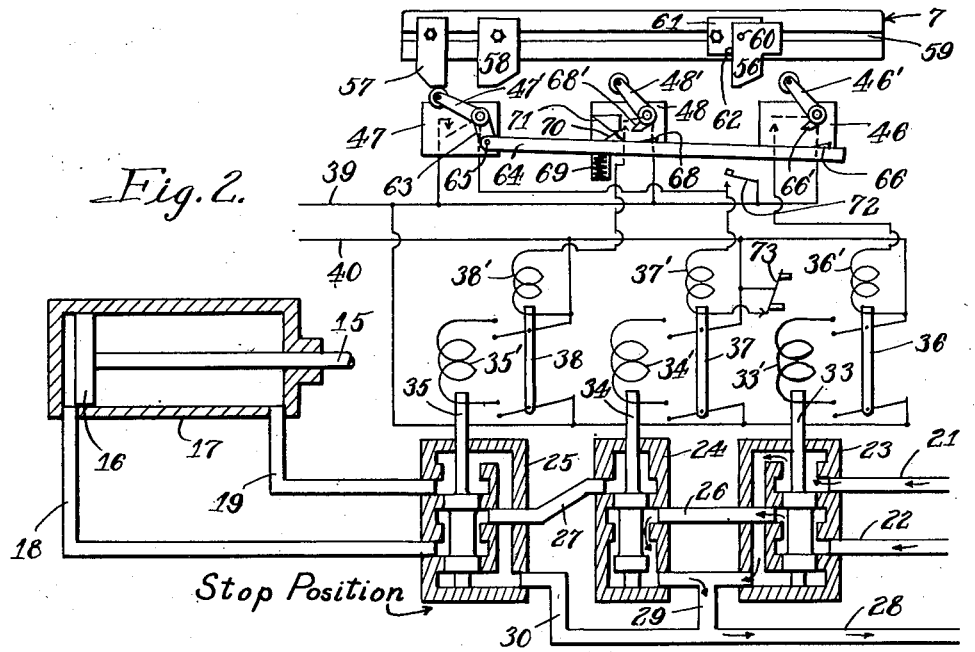
Fig. 2.
Stop Position
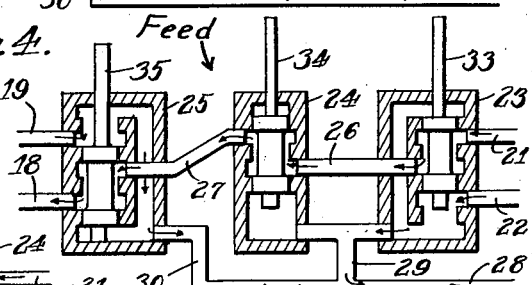
Fig. 4.
Feed
Fig. 3.
Quick Approach
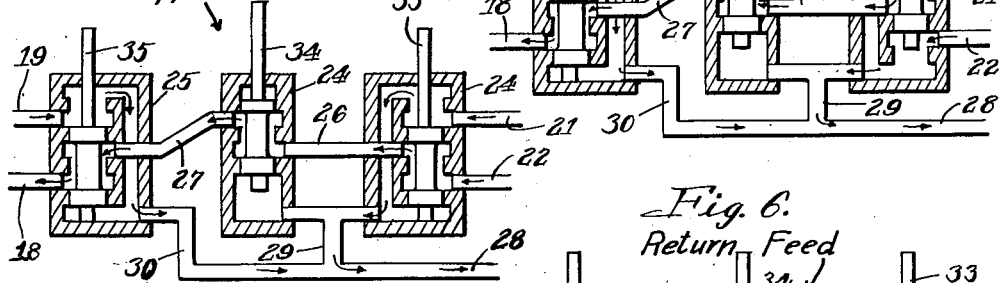
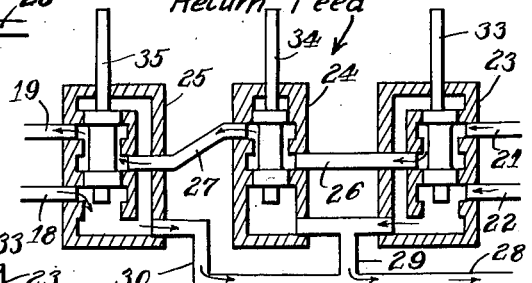
Fig. 6.
Return Feed
Fig. 5.
Quick Return
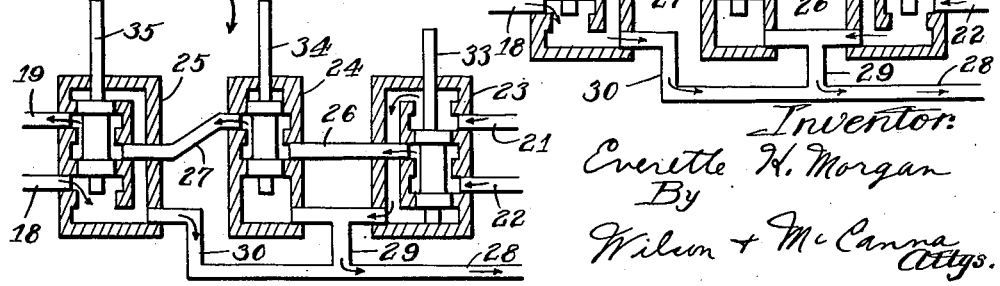
Inventor:
Everette K. Morgan
By
Wilson + McCanna
Attys.

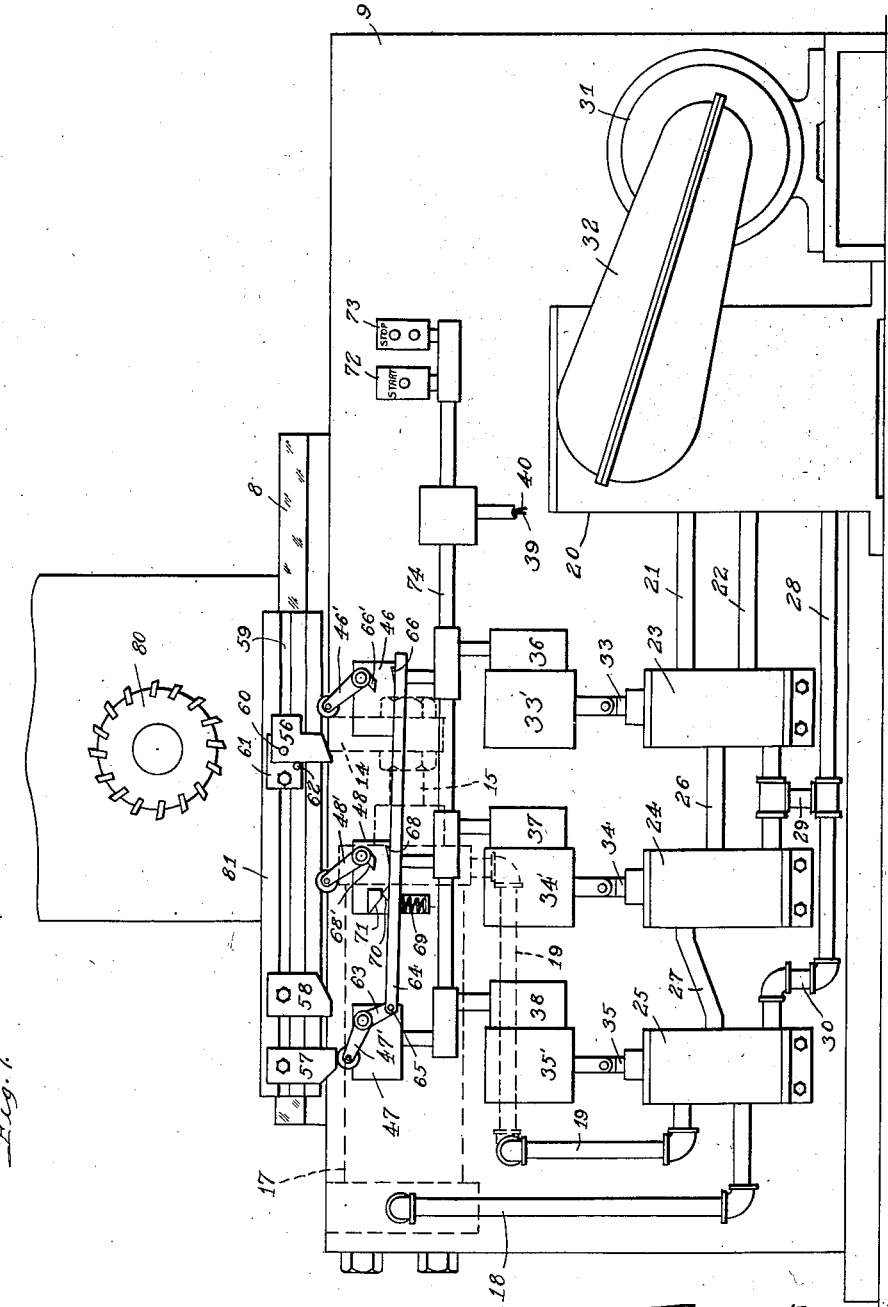

Patented Aug. 18, 1936

2,051,052

UNITED STATES PATENT OFFICE 2,051,052

MACHINE TOOL HYDRAULIC CONTROL SYSTEM

Everette K. Morgan, Rockford, Ill., assignor to The Ingersoll Milling Machine Company, Rockford, Ill., a corporation of Illinois Application December 29, 1927, Serial No. 243,357

61 Claims. (Cl. 90—21.5)

This invention relates to hydraulic control systems for machine tools adapted for general application for the fully automatic or semi-automatic control of the cycle of quick approach, feed, quick return, and stop, and variations of said cycle, adaptable for machines for boring, drilling, milling, reaming, facing, counterboring chamfering, grinding or tapping.

The principal object of my invention consists in the provision of an extremely simple system of controls for the purposes described including essentially only three valves, the operation of which in a predetermined order in proper relation to the movement of the reciprocating tool carriage or work carriage, controls the entire cycle. Thus, one valve of the three, called the selector valve, determines by its position the speed of operation; a second valve, called the run and stop valve, determines by its position whether the carriage to be operated is in operation or not, and the third valve, called the forward and reverse valve, determines by its position the direction of movement of the carriage. In the use of this control system in the ordinary simple type of machine where the finished work is removed, a new piece substituted, the operation performed thereon, and the machine stopped for the removal of the finished piece and the substitution again of a new piece and so on, the three valves referred to provide for the simple cycle of quick approach, feed, quick return and stop. However, my control system is adaptable practically universally inasmuch as all machine tools, whether of a simple type or not, involve the operation of a saddle or carriage at low or high speeds for feed and rapid traverse movements, and operation back and forth, as well as starting and stopping. Thus, for example, my invention is applicable not only to periodically operated machine tools but continuously operated machine tools as well; continuous reciprocating type milling machines for example, where quick approach and feed are required in both directions, in which case, while one piece of work is being operated upon, a finished piece is being removed and supplanted by another piece to be operated upon.

Another object of my invention consists in the provision of improved means for operating the three valves electro-magnetically, the circuits for the solenoids serving to operate the valves being controlled suitably by switches in turn operated by dogs carried by the moving saddle, switches of the elevator-door type being nicely adapted for this purpose used in connection with relays to make and break the circuits through the solenoids. The electrical control of the valves makes for still greater flexibility in the application of my invention, it being a feature of my invention, for example, to provide a starting switch in parallel with the switch controlling the start and stop valve whereby the operator, by operation of this switch, can throw the machine into operation at will. A further feature lies in the provision of an emergency stop switch connected in series with the aforesaid switch controlling the start and stop valve so that the operator has a means under his control to stop the machine at will regardless of the position of the saddle or whether the same is on its feed or rapid traverse movement. This control is very handy in any emergency or during tool set-up.

The invention is fully disclosed in the accompanying drawings in which—

Fig. 2 is a developed view of the system showing the valves in section purely diagrammatically with the oil circuit indicated by small arrows, and also showing the set of electrical controls employed in connection with the valves and the means for operating said controls. The valves are shown in the stop position.

Figs. 3, 4 and 5 are views along the lines of Fig. 2 showing the positions of the valves for quick approach, feed, and quick return, respectively;

Fig. 6 is another similar view showing the valves in position for return feed, such as feed being contemplated as a modification as brought out above, as for example where the system is employed in connection with a continuous reciprocating type milling machine or the like; and Fig. 7 is a side view of a milling machine equipped with my improved hydraulic control system.

The same reference numerals are applied to corresponding parts throughout the views.

Figure 1:
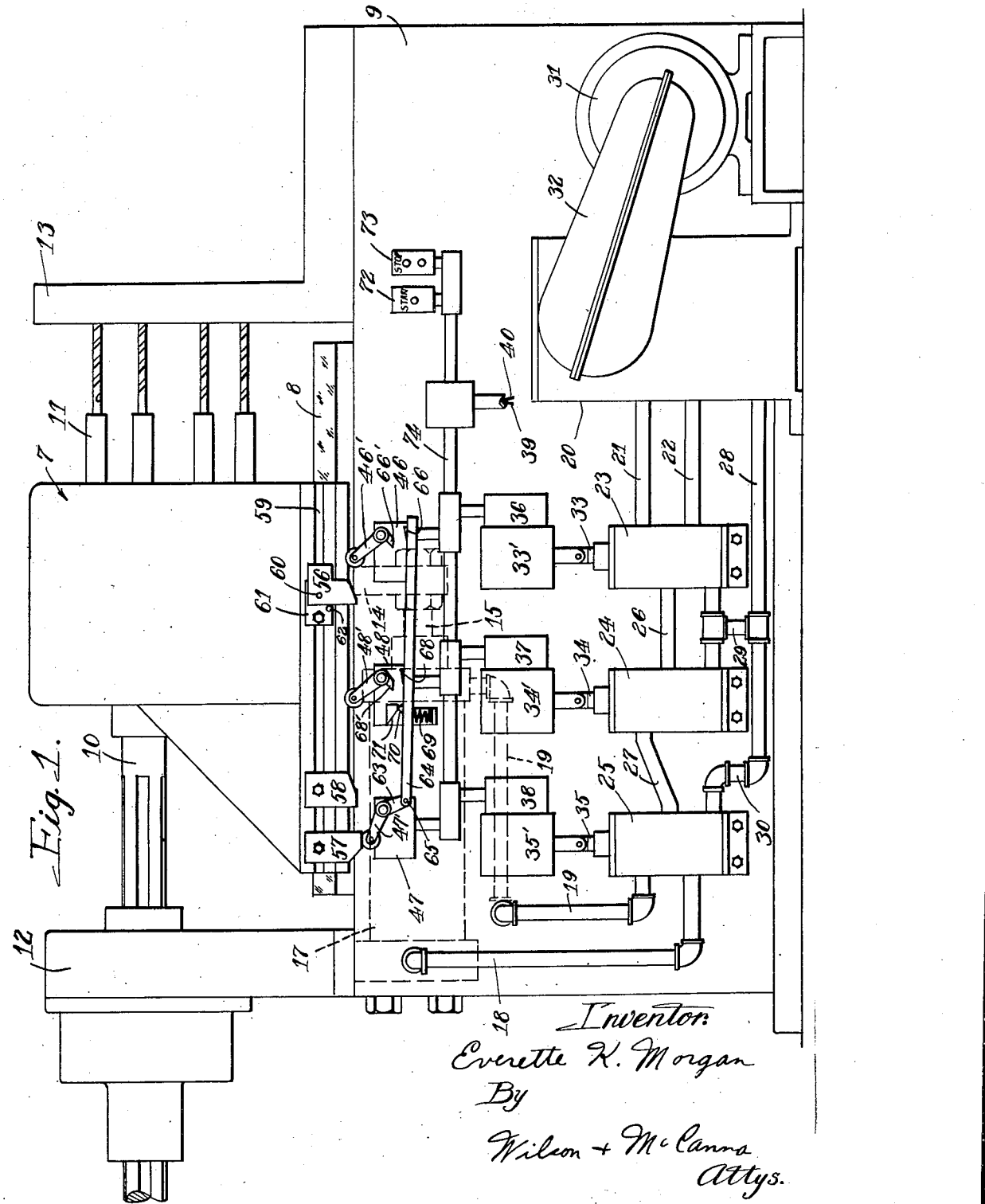
Figure 1 is a side view of a multiple spindle horizontal drilling machine equipped with my improved hydraulic control system.

The machine in connection with which I have disclosed my improved hydraulic control system is, as stated above, a multiple spindle horizontal drilling machine, having a saddle 7 reciprocable on ways 8 on the bed 9. The spindle drive shaft 10 having the usual connections with the cluster of spindles 11 in the saddle 7 is splined as shown for a sliding driving connection with a driven gear within the housing 12, thus permitting the driving of the drill spindles during the quick approach, feed, and quick return movements of the saddle with reference to the work fixture 13, through which the drills are arranged to operate in the usual way. While a single end machine is shown it should be understood that the invention is in nowise limited to use with that type but has, in fact, been utilized to good advantage on two, three, and four-way machines. It should further be understood, as indicated above, that the invention is not limited in its application to periodical (semi-automatic) machines of which the one disclosed is an example but may be employed on continuous (fully automatic) machines as well.

The saddle 7, as indicated in dotted lines in Fig. 1, has a depending boss 14 connected with a reciprocating ram 15. The latter has a piston 16 on the end thereof reciprocable in a hydraulic cylinder 17 suitably fixed in the bed 9. Two pipes 18 and 19 connected to the opposite ends of said cylinder are arranged to introduce the oil or other motive fluid behind or in front of the piston therein and correspondingly advance or return the saddle. Obviously, a difference in the amount of oil delivered per unit of time determines the lineal speed of operation of the saddle and in this way is determined the speed of operation for feed or rapid traverse (quick approach or quick return). It is also believed to be evident that the oil delivered for the feed movements, while small in volume, has to be under comparatively high pressure, whereas the oil delivered for the traverse movements, while relatively large in volume, may be delivered under comparatively low pressure. According to my invention I provide a pump 20 operating continuously to supply a low delivery of oil under high pressure through the pipe 21 and a high delivery of oil under comparatively low pressure through the pipe 22. These pipes are connected with three two-position valves 23, 24 and 25 connected in series by a pipe 26 between the valves 23 and 24 and a pipe 27 between the valves 24 and 25. The valve 25, the end one of the series, is connected with the pipes 18 and 19, previously referred to. The valves have communication with a common drain 28, the valves 23 and 24 by way of pipe connection 29 and the valve 25 by way of pipe connection 30. The pump 20, known as the oil-gear QC pump and resembling somewhat the one shown in Ferris Patent 1,619,200, issued March 1, 1927, is driven continuously by the electric motor 31 through the chain and sprocket connection indicated at 32. This type of pump has a piston pump section arranged to deliver oil at a rate of 0–400 cu. in. per minute at a pressure of 0–1000 pounds per sq. in. determined by the setting of a relief valve. If desired, the delivery from the piston pump may be varied by means of an adjustable set screw arranged to move a rocker beam connected with the pintle of the pump to throw the same off center. This adjustment in the degree of eccentricity of the pintle varies the extent of the delivery. The piston pump is the one furnishing the low delivery through the pipe 21. This pump also includes a gear pump section operating continuously with the piston pump section delivering oil at a rate of 0–2400 cu. in. per minute at a pressure of 0–250 pounds per sq. in. as determined by the setting of another relief valve. The gear pump is the one furnishing the high delivery to the pipe 22. Valve 23 is called the "selector" valve by reason of the fact that the position of its plunger 33 determines whether the low delivery pipe 21 or the high delivery pipe 22 is placed in communication with the valve 24 by way of the pipe 26 and, accordingly, whether the saddle is moved at low speed (see Figs. 4 and 6) or high speed (see Figs. 3 and 5). Valve 24 is called the "run and stop" valve for the reason that the position of its plunger 34 determines whether the oil delivered to the valve through the pipe 26 is conducted to the valve 25 through the pipe 27, as in running (see Figs. 3–6) or is permitted to bypass by way of the pipe connection 29 to the drain 28, as in the stop position (see Fig. 2). Valve 25 is called the "forward and reverse" valve for the reason that the position of its plunger 35 determines whether the oil delivered to the valve 25 through the pipe 27 is conducted to the pipe 18, as in quick approach or feed (see Figs. 3 and 4) or is conducted to the pipe 19, as in quick return or return feed (see Figs. 5 and 6).

In operation, without considering for the moment how the operation of the valves is taken care of, it will be evident by observation of Fig. 2, where the valves are in "stop" position, that the oil delivered to the valve 23 through the pipe 21 is bypassed directly to the pipe connection 29 for return through the drain 28 to the sump of the pump 20, both the piston and gear pump sections of said pump having communication with the same sump. The oil delivered to the valve 23 through the pipe 22 is conducted through the pipe 26 to the valve 24 but, by reason of the fact that the plunger 34 of said valve is in "stop" position, the oil is bypassed through the pipe connection 29 to the drain 28 for return to the sump. In other words, none of the oil reaches the valve 25 and, for that reason, no oil is supplied through either of the pipes 18 and 19 to the cylinder 17. When plunger 34 of valve 24 is shifted to "run" position, as shown in Fig. 3, which is labeled "quick approach", the oil delivered to the valve 23 through the pipe 22 is conducted through pipe 26 to valve 24 and from there through pipe 27 to valve 25. Then, by reason of the fact that plunger 35 of valve 25 is in its "forward" position the oil is conducted into pipe 18 to enter the cylinder 17 behind the piston 16. Bearing in mind that the oil referred to originated at pipe 22, the high delivery pipe, it will be evident that the saddle 7 is moved at a high rate of speed. Hence, this setting of the valves is for "quick approach". During this operation it will be evident that the oil delivered to the valve 23 through the low delivery pipe 21 is bypassed to the drain 28, as shown by the small arrows; also that the oil from in front of the piston 16 in the cylinder 17 is returned to the drain through the pipe 19, the same being bypassed through the valve 25 to the pipe connection 30, as indicated by the arrows. Now, assume that the plungers 34 and 35 of valves 24 and 25 are not disturbed but plunger 33 of valve 23 is shifted to the "low delivery" position shown in Fig. 4; in that case, the high delivery oil passes directly to the drain 28, as indicated by the arrows, but the low delivery oil is conducted through the pipe 26 to the valve 24 and thence through pipe 27 to valve 25 for passage through pipe 18 to the cylinder 17 behind the piston 16 therein. It is evident that since the oil utilized for the operation of the saddle in this case originated at pipe 21, the low delivery pipe, the saddle will be moved at a low rate of speed. Hence, this setting is for "feed". In Fig. 5, which is labeled "quick return", it will be evident upon comparison with Fig. 3 that the only difference in the setting of the valves as between "quick return" and "quick approach" is that the plunger 35 of valve 25 is shifted from the "forward" position shown in Fig. 3 to the "reverse" position shown in Fig. 5. The same is true as regards Figs. 4 and 6; the shifting of the plunger 35 from the forward position shown in Fig. 4 to the reverse position shown in Fig. 6 changes the direction of movement of the saddle, thus making a feed or traverse movement possible in either direction. It will presently appear that the machine shown in Fig. 1 has no need for return feed movement of the saddle and the system of controls for the valves as shown in Figs. 1 and 2 contemplate merely quick approach, feed, quick return, and stop. However, since return feed is contemplated by my invention in many other possible applications thereof the setting of the valves required for such operation has been disclosed in Fig. 6. In other words, by proper modification of the controls for the valve it is possible to obtain rapid traverse forward and feed (forward) and rapid traverse reverse and feed (reverse), as for example in a continuously operated machine such as has been described above.

The plungers 33—35 of the valves 23—25 normally occupy the positions shown in Fig. 2. Spring means may be employed, if desired, to tend normally to move the same to said positions. For simplicity, however, it may be assumed for the present purposes that the plungers tend normally to gravitate to the positions shown but are arranged to be shifted to their other positions by magnetic solenoids 33'—35'. That is to say, the plunger 33, which is normally in its "high delivery" position, is arranged to be moved upon energization of the solenoid 33' to its "low delivery" position; the plunger 34, which is normally in its "stop" position, is arranged upon energization of the solenoid 34' to be shifted to its "run" position, and the plunger 35, which is normally in its "forward" position, is arranged upon energization of the solenoid 35' to be shifted to its "reverse" position. Circuits through the solenoids 33'—35' are arranged to be completed by the closing of relay switches 36—38 connected across the lines 39 and 40. The relay solenoids 36'—38' when energized singly or in certain combinations close the switches 36—38 correspondingly either singly or in certain combinations, as it is thought will be evident, so that any one or more of the plungers 33—35 can be operated. Three switches 46—48 are connected in series with the solenoids 36'—38' across the lines 39 and 40 so that the closing of these switches energizes the solenoids and in turn causes the closing of the relay switches 36—38. The switches 46—48 are suitably of the elevator-door type and have levers 46'—48' normally occupying a raised position (see levers 46' and 48' in Fig. 2) but arranged to be operated to depressed position (see lever 47' in Fig. 2). The switches 46 and 48 in the normal position of the levers 46' and 48' thereof are normally open, as indicated by the dotted lines in Fig. 2, whereas the switch 47 is normally closed, that is, with its lever 47' in the normal raised position. As shown in Fig. 2, switch 47 is held open. The levers 46'—48' are arranged to be operated by dogs 56—58 arranged to be fixed in the desired positions of adjustment in a slot 59 provided in the side of the saddle 7. The dogs 57 and 58 are rigid with the saddle whereas the dog 56 is pivotally mounted, as at 60, on a plate 61 fixed in the slot 59. The dog 56, while free for swinging movement in a counter-clockwise direction from the position shown, is held by engagement with pin 62 against swinging movement in a clockwise direction from the position shown. In other words, the dog 56, in movement of the saddle 7 to the right, is arranged to engage the roller on the end of the lever 46' and cause the depression of said lever in passing over its roller, but in the return movement of the saddle, the dog 56 will be inoperative and will simply be swung out of the way upon coming into engagement with the roller on the lever 46'. The lever 47' of the switch 47 has a bell crank extension 63 to which one end of a latch 64 is pivoted, as indicated at 65. The latch 64 has two teeth 66 and 68 projecting therefrom and arranged to engage in front of fingers 66' and 68' provided on the levers 46' and 48' whereby to hold said levers in depressed position in a manner presently to appear. The latch 64 is normally urged upwardly to bring the teeth 66 and 68 into engagement with the fingers 66' and 68', as for example by means of a compression spring 69. However, when the lever 47' is depressed, a projection 70 on the latch 64 is caused to ride along the face of a cam 71 and move the latch 64 to an out of the way position, in which position it appears in Figs. 1 and 2.

Two push button switches 72 and 73 are provided in connection with the electrical controls described, the former being a starting switch and the latter an emergency switch. Switch 72 is connected in parallel with the switch 47, which is in series with the solenoid 37', so that the closing of said switch will serve to energize the solenoid 37' even though the switch 47 may, at the time, be held open. Switch 72 is used in starting the machine as will presently appear. The switch 73 is connected in series with the solenoid 37' and is arranged to be opened at any time to break the circuit through said solenoid even though the switch 47 may, at the time, be closed. Switch 73 is used in stopping the machine at any time, as will presently appear. As shown at 74 in Fig. 1, a conduit may be provided running from the switches 46—48 and the switches 72 and 73 to the relay switches 36—38 to contain all of the wiring required.

In operation, assuming at the outset that the machine has just completed an operation, so that the controls are left just as they appear in Fig. 2, the switch 47 being held open by the dog 57, the operator desiring to start the machine merely pushes the button of the switch 72 to close a circuit through the solenoid 37' and thereby close the relay switch 37 so as to raise the plunger 34 to the position shown in Fig. 3. This starts the saddle moving forward on the quick approach. The operator keeps the switch 72 closed at least long enough to allow the dog 57 to ride off the roller of the lever 47' so as to permit the switch 47 to close. Incidentally the latch 64 is thereby elevated to operative position under the action of its spring 69. In the movement of the saddle forward on its quick approach the first dog to come into play is the dog 56 which engages and depresses the lever 46'; thereby closing the circuit through the solenoid 36' and in turn closing the relay switch 36 so that the plunger 33 is raised to the position shown in Fig. 4. Thus, the saddle is thrown from quick approach movement to feed movement, it being understood that the plunger 34 is not disturbed inasmuch as the switch 47 during all of this time has remained closed. When the dog 56 depresses the lever 46' the tooth 66 catches behind finger 66' and prevents the switch from opening after the dog has moved out of engagement with the roller on the lever 46'. The feed movement continues, therefore, until the dog 58 comes into engagement with the roller on the lever 48' of the switch 48 and depresses the same. The depression of said lever brings the finger 68' into position in front of the tooth 68 to keep the switch 48 closed, but it will be evident that enough movement of the latch 64 is necessitated in this operation to release the finger 66' so that the switch 46 is opened and the plunger 33 dropped back to its normal position, the high delivery position. When the switch 48 is closed solenoid 38' is energized. This closes relay switch 38 so that plunger 35 is raised to the position shown in Fig. 5. Meanwhile, it will be observed that switch 47 still remains closed so that the position of plunger 34 is not disturbed. Near the end of the quick return movement of the saddle the dog 56 is lifted out of the way upon coming into engagement with the roller on the lever 46' so that the switch 46 is not closed by reason of the dog passing the same. At the end of the return movement the dog 57 comes into engagement with the roller on the end of the lever 47' and opens the switch 47. This deenergizes the solenoid 37', causing the relay switch 37 to open and break the circuit for the solenoid 34' so that the plunger 34 drops from its run position to the normal stop position. The machine is thereby brought to a halt. It will be evident that the operator may, at any time, open the switch 73 and bring the machine to a halt regardless of the position of the saddle and regardless of whether it is on quick approach, feed, or quick return. The reason for this is evident; the opening of the relay switch 37 permits the plunger 34 to drop from the run position, to the stop position and that occurs the moment the solenoid 37' is deenergized by the breaking of the circuit therethrough at the switch 73. The machine can, therefore, be stopped in any emergency or may be stopped at different points in the travel of the saddle as required during tool set-up.

In Figure 7, I have shown my invention applied to a milling machine, like numerals being applied to like parts above described. In this case the cutter 80 is carried by a suitable spindle mounted for rotation on a horizontal axis. The work to be milled will be mounted on the work support or table 81 reciprocable on the ways 8 on the bed 9, it being obvious that the work support reciprocates in a path transverse to the axis of the tool spindle. The controls for the valves are set for the same cycle as shown in Fig. 1, that is, for quick approach, feed, quick return, and stop; and, as described above, other cycles may be obtained by proper setting of the controls.

It is believed the foregoing description conveys a clear understanding of my invention and of its various objects and advantages. It will be understood that the invention is capable of numerous applications departing to various extents from that herein shown and described. All modifications, adaptations, and variations of the invention it should, therefore, be understood are to be construed as embraced by the appended claims.

I claim:

1. In a fluid control system of the character described, the combination with a part to be operated, of a working cylinder, a source of pressure fluid supply, a pair of interconnected two-position valves between said source and said cylinder, one of said valves being a run and stop valve, the one position thereof being the run position and the other the stop position, and the other of said valves being a forward and reverse valve, the one position thereof corresponding to forward operation and the other position thereof corresponding to reverse operation, said valves being normally in one position, a source of electric current supply, electrical means connected therewith for each valve for shifting the same to the other position, a manually controlled switch whereby the first valve may be shifted to start the movement of the operated part, another switch operated automatically in the movement of the operated part for shifting the other valve so as to reverse the direction of movement of said part, and still another switch arranged to be operated automatically at a certain point in the reverse movement of said part whereby the first mentioned valve is returned to normal position to stop the operation of said part.

2. In a fluid control system of the character described, the combination with a part to be operated, of a working cylinder, a source of pressure fluid supply, a pair of interconnected two-position valves between said source and said cylinder, one of said valves being a run and stop valve, the one position thereof being the run position and the other the stop position, and the other of said valves being a forward and reverse valve, the one position thereof corresponding to forward operation and the other position thereof corresponding to reverse operation, said valves being normally in one position, a source of electric current supply, electrical means connected therewith for each valve for shifting the same to the other position, a manually controlled switch whereby the first valve may be shifted to start the movement of the operated part, another switch operated automatically in the movement of the operated part for shifting the other valve so as to reverse the direction of movement of said part, a third switch arranged to be operated automatically at a certain point in the reverse movement of said part whereby the first mentioned valve is returned to normal position to stop the operation of said part, and a fourth switch in series in the circuit for the electrical means associated with the first valve arranged to be opened at any time to shift said valve back to position to stop the movement of the operated part.

3. In a fluid control system of the character described, the combination with a part to be operated, of a working cylinder, a source of pressure fluid supply, a pair of interconnected two-position valves between said source and said cylinder, one of said valves being a run and stop valve, the one position thereof being the run position and the other the stop position, and the other of said valves being a forward and reverse valve, the one position thereof corresponding to forward operation and the other position thereof corresponding to reverse operation, said valves being normally in one position, a source of electric current supply, electrical means connected therewith for each valve for shifting the same to the other position, a manually controlled switch whereby the first valve may be shifted to start the movement of the operated part, another switch operated automatically in the movement of the operated part for shifting the other valve so as to reverse the direction of movement of said part, a third switch arranged to be operated automatically at a certain point in the reverse movement of said part whereby the first mentioned valve is returned to normal position to stop the operation of said part, and a fourth switch manually operable at any time to shift the first mentioned valve back to normal position to stop the movement of the operated part regardless of the position thereof.

4. In a fluid control system of the character described, the combination with a part to be operated, of a single working cylinder, means for supplying motive fluid under pressure from two sources, one a low rate and the other a high rate fluid delivery source, and valve mechanism between said means and said cylinder for controlling the admission of fluid to the latter, said valve mechanism comprising three independently shiftable two position valve members serving by the operation of one or more at a time in a predetermined relation to one another to control all of the phases of operation of the operated part, namely, stop or go, high or low speed, and forward or reverse.

5. In a fluid control system of the character described, the combination with a part to be operated, of a working cylinder, means for supplying motive fluid under pressure, valve mechanism between said means and said cylinder for controlling the admission of fluid to the latter whereby to control the operation of the operated part, said valve mechanism comprising three reciprocable valve members each of which is arranged to occupy either limit position whereby the three serve jointly to control all of the phases of operation of the operated part, namely, stop or go, high or low speed, and forward or reverse, each of said valve members tending normally to occupy one limit position and assuming such position when permitted, and means operable in the operation of the part being operated for operating the valve members to their other limit positions.

6. A machine tool having, in combination, a reciprocable machine element, a working cylinder, means arranged to deliver motive fluid at a low rate, another means arranged to deliver motive fluid at a high rate, a valve having connections with both means and having a delivery port, said valve in one position serving to conduct fluid from the one means to said port and in the other position from the other means to the same port, and a companion valve having connections with the opposite ends of the working cylinder and arranged to have communication with the delivery port of the first mentioned valve, said last mentioned valve being arranged in one position to conduct fluid supplied thereto from either means to the one end of said cylinder and in the other position thereof to conduct fluid from either of said means to the opposite end of said cylinder.

7. A system as set forth in claim 6 including means operated at a certain point in the movement of the operated part for shifting the first mentioned valve, and another means operated at a certain point in the movement of the operated part for shifting the other valve.

8. In a system as set forth in claim 6 wherein the valves tend to move to a normal position, a source of electric current supply, electrical means for shifting said valves from their normal position, a switch operated at a certain point in the movement of the operated part for shifting the first valve, and another switch operated at another point in the movement of the operated part for shifting the other valve.

9. In a fluid control system of the character described, the combination with a part to be operated, of a working cylinder, means for delivering motive fluid at a low rate, another means for delivering motive fluid at a comparatively high rate, and three two-position valves connected between said means and the working cylinder, the first of said valves being connected with both of said means and having a high rate delivery and a low rate delivery position and being connected to the second valve, the second valve having a run and a stop position and being connected to the third valve, and the third valve having a forward and a reverse position and being connected with the opposite ends of the working cylinder.

10. In a system as set forth in claim 9 wherein the low and high rate fluid delivery means have a drain for returning fluid thereto, connections establishing communication between drain ports provided in said valves and the aforesaid drain, the first valve when in low rate delivery position having the high rate delivery means discharging through the drain port and vice versa in the high rate delivery position, the second valve in the stop position serving to conduct fluid delivered thereto to the drain port, and the third valve, when in one position to conduct fluid to one end of the working cylinder, serving to establish communication between the other end of the working cylinder and the drain port of said valve and vice versa in its other position.

11. A system as set forth in claim 9 including means operated in the movement of the operated part for automatically shifting one of said valves from its one position to the other.

12. A system as set forth in claim 9 including means operated at certain points in the movement of the operated part for operating all of said valves.

13. A system as set forth in claim 9 wherein the run and stop valve has manually operable means for shifting the same, and means operated at certain points in the movement of the operated part for shifting the other valves.

14. A system as set forth in claim 9 wherein the run and stop valve has manually operable means for shifting the same, and means operated at a certain point in the movement of the operated part for shifting one of the other valves.

15. In a system as set forth in claim 9 wherein the valve tend to move toward a normal position, a source of electric current supply, electrical means for each of said valves having connection with said source arranged to shift the valves from normal position, a switch associated with the second valve arranged to be operated manually to shift the same to start the movement of the operated part, a second switch associated with the first valve arranged to be operated automatically at a certain point in the movement of the operated part to shift said valve to change the rate of movement of said part, a third switch associated with the third valve arranged to be operated automatically at a certain point in the movement of the operated part to shift said valve to reverse the direction of movement of said part, and a fourth switch associated with the second valve arranged to be operated at a certain point in the reverse movement of said part to shift the valve back to normal position and thereby stop said part.

16. In a system as set forth in claim 9 wherein the valves tend to move toward a normal position, a source of electric current supply, electrical means for each of said valves having connection with said source arranged to shift the valves from normal position, a switch associated with the second valve arranged to be operated manually to shift the same to start the movement of the operated part, a second switch associated with the first valve arranged to be operated automatically at a certain point in the movement of the operated part to shift said valve to change the rate of movement of said part, a third switch associated with the third valve arranged to be operated automatically at a certain point in the movement of the operated part to shift said valve to reverse the direction of movement of said part, a fourth switch associated with the second valve arranged to be operated at a certain point in the reverse movement of said part to shift the valve back to normal position and thereby stop said part, and a fifth switch associated with the second valve along with the first and fourth switches arranged to be operated at any point in the movement of the operated part to shift said valve back to normal position so as to stop the operated part.

17. In a system as set forth in claim 9 wherein the valves tend to move toward a normal position, a source of electric current supply, electrical means for each of said valves having connection with said source arranged to shift the valves from normal position, a switch associated with the second valve arranged to be operated manually to shift the same to start the movement of the operated part, a second switch associated with the first valve arranged to be operated automatically at a certain point in the movement of the operated part to shift said valve to change the rate of movement of said part, a third switch associated with the third valve arranged to be operated automatically at a certain point in the movement of the operated part to shift said valve to reverse the direction of movement of said part, a fourth switch associated with the second valve arranged to be operated at a certain point in the reverse movement of said part to shift the valve back to normal position and thereby stop said part, a fifth switch associated with the second valve along with the first and fourth switches arranged to be operated at any point in the movement of the operated part to shift said valve back to normal position so as to stop the operated part, and means mechanically interconnecting the second, third and fourth switches whereby either the second or the third switch is held closed along with the fourth switch and whereby both the second and third switches are opened when the fourth is opened.

18. In a fluid control system of the character described, the combination with a part to be operated, of a working cylinder, means arranged to deliver motive fluid at a low rate, another means arranged to deliver motive fluid at a high rate, a valve having connections with both means and having a delivery port, said valve in one position serving to conduct fluid from the one means to said port and in the other position from the other means to the same port, and an independently operable companion valve between the working cylinder and the other valve arranged in one position to conduct fluid from the delivery port of the other valve to the working cylinder and in another position to conduct the fluid to an idle discharge port.

19. A system as set forth in claim 18 including means operated in the movement of the operated part for shifting one of said valves.

20. A system as set forth in claim 18 including means operable manually to shift the second valve whereby to commence the operation of the operated part, and means operable at a certain point in the movement of the operated part for shifting the other valve.

21. In a system as set forth in claim 18 wherein the valves tend to move to a normal position, electrical means for shifting said valves from their normal position, a switch arranged for manual operation to cause the shifting of the second valve whereby to commence the operation of the operated part, and another switch operated at a certain point in the movement of the operated part for the shifting of the other valve.

22. In a fluid control system of the character described, the combination with a part to be operated, of a working cylinder, means for delivering motive fluid at a low rate, another means for delivering motive fluid at a comparatively high rate, and three two-position valve members disposed in intercommunicating valve chambers connected between said means and the working cylinder, one of said valve chambers being connected with both of said means and the valve member therein having a high rate delivery position and a low rate delivery position, another of said valve chambers having the valve member therein arranged to occupy a forward or a reverse position, and the remaining valve chamber having the valve member therein arranged to occupy a run or a stop position, one of the last two mentioned valve chambers being connected with the working cylinder and being arranged to supply motive fluid thereto to either end thereof.

23. In a system as set forth in claim 22 wherein the low and high rate fluid delivery means have a drain for returning fluid thereto, connections establishing communication between said drain and drain ports provided in the valve chambers, the one valve chamber when its valve member is in low rate delivery position having the high rate delivery means discharging through the drain port and vice versa in the high rate delivery position of the valve member, the second named valve chamber when the valve member therein is in one position to conduct fluid to one end of the working cylinder serving to establish communication between the other end of the working cylinder and the drain port of said valve, and vice versa in its other position, and the remaining valve chamber in the stop position of its valve member serving to conduct fluid delivered thereto to the drain port.

24. A system as set forth in claim 22 including means operated in the operation of the part being operated for automatically shifting one or more of said valve members from one position to the other.

25. A system as set forth in claim 22 including means operated at certain points in the movement of the operated part for operating all of said valve members.

26. In a system as set forth in claim 22 wherein the run and stop valve member has manually operable means for shifting the same from stop to run position, means operable at certain points in the movement of the operated part for shifting one or both of the other valves, and means operated at the end of the travel of the operated part for shifting the run and stop valve to stop position.

27. In a system as set forth in claim 22 wherein the valve members tend to move toward a normal position, a source of electric current supply, electrical means for each of the valve members having connection with said source and arranged to shift the valve members from normal position, and means operable at predetermined points in the movement of the operated part for controlling the electrical circuits for the last mentioned means.

28. In a machine tool, the combination with a movable support, of a working cylinder, a source of pressure fluid supply, a pair of interconnected two-position valves between said source and said cylinder, one of said valves being a run and stop valve whose one position is for run and the other for stop, and the other of said valves being a forward and reverse valve whose one position is for forward and the other for reverse, said valves being normally in one position, manually operable means for shifting the first valve whereby to start the movement of the movable support, a dog adapted during the movement of the support to cause the shifting of the other valve so as to reverse the direction of movement of said support, and another dog arranged so as normally to cause the shifting of the first valve automatically back to neutral position at the end of the reverse movement of the support to stop the support.

29. In a machine tool, the combination with a movable support, of a working cylinder, a source of pressure fluid supply, a pair of interconnected two-position valves between said source and said cylinder, one of said valves being a run and stop valve whose one position is for run and the other for stop, and the other of said valves being a forward and reverse valve whose one position is for forward and the other for reverse, said valves being normally in one position, a source of electric current supply, electrical means connected therewith for each valve for shifting the same to the other position, a manually controlled switch whereby the first valve may be shifted to start the movement of the movable support, a second switch arranged when operated to shift the other valve so as to reverse the direction of movement of the support, a third switch arranged when operated to return the first mentioned valve to normal position to stop the movement of the support, and dogs for operating the second and third switches at predetermined points in the movement of the support.

30. The structure as set forth in claim 25 including a fourth switch in series in the circuit for the electrical means associated with the first valve and arranged to be opened at any time to shift said valve back to position to stop the movement of the support.

31. The structure as set forth in claim 25 including a fourth switch in series in the circuit for the electrical means associated with the first valve and arranged to be opened at any time to shift said valve back to position to stop the movement of the support, the said switch being manually operable.

32. In a machine tool, the combination with a movable support, of a working cylinder, means arranged to deliver motive fluid at a low feed rate, another means arranged to deliver motive fluid at a high rapid traverse rate, a valve having connections with both means and having a delivery port, said valve in one position serving to conduct fluid from the one means to said port and in the other position from the other means to the same port, and a companion valve having connections with the opposite ends of the working cylinder and arranged to have communication with the delivery port of the first mentioned valve, said valve being arranged in one position to conduct fluid supplied thereto from either means to the one end of said cylinder and in the other position thereof to the opposite end of said cylinder, and a dog adapted during the movement of the support to actuate one of said valves.

33. In a machine tool, the combination with a movable support, of a working cylinder, means arranged to deliver motive fluid at a low rate, another means arranged to deliver motive fluid at a high rate, a valve having connections with both means and having a delivery port, said valve in one position serving to conduct fluid from the one means to said port and in the other position from the other means to said port, and a companion valve having connections with the opposite ends of the working cylinder and arranged to have communication with the delivery port of the first mentioned valve, said valve being arranged in one position to conduct fluid supplied thereto to the one end of said cylinder and in the other position thereof to the opposite end of said cylinder, and dogs associated with said valves and adapted during the movement of the support to cause the shifting of the first valve at a certain point in the movement of the support and the shifting of the other valve at a certain point in the movement of the support.

34. In a machine tool, the combination with a movable support, of a working cylinder, means for delivering motive fluid at a low rate, another means for delivering motive fluid at a comparatively high rate, and three two-position valves connected between said means and the working cylinder, the first of said valves being connected with both of said means and having a high rate delivery and a low rate delivery position and being connected to the second valve, the second valve having a run and a stop position and being connected to the third valve, and the third valve having a forward and a reverse postion and being connected with the opposite ends of the working cylinder, and a plurality of dogs adapted during the movement of the support for causing the shifting of the valves in a predetermined sequence.

35. In a machine tool, the combination with a movable support, of a working cylinder, means for delivering motive fluid at a low rate, another means for delivering motive fluid at a comparatively high rate, and three two-position valves connected between said means and the working cylinder, the first of said valves being connected with both of said means and having a high rate delivery and a low rate delivery position and being connected to the second valve, the second valve having a run and a stop position and being connected to the third valve, and the third valve having a forward and a reverse position and being connected with the opposite ends of the working cylinder, and a dog adapted during the movement of the support to automatically cause the shifting of one of said valves from one position to the other.

36. In a machine tool, the combination with a movable support, of a working cylinder, means for delivering motive fluid at a low rate, another means for delivering motive fluid at a comparatively high rate, and three two-position valves connected between said means and the working cylinder, the first of said valves being connected with both of said means and having a high rate delivery and a low rate delivery position and being connected to the second valve, the second valve having a run and a stop position and being connected to the third valve, and the third valve having a forward and a reverse position and being connected with the opposite ends of the working cylinder, manually operable means for shifting the run and stop valve, and dogs adapted during the movement of the support to cause the shifting of the other valves.

37. In a machine tool, the combination with a movable support, of a working cylinder, means for delivering motive fluid at a low rate, another means for delivering motive fluid at a comparatively high rate, and three two-position valves connected between said means and the working cylinder, the first of said valves being connected with both of said means and having a high rate delivery and a low rate delivery position and being connected to the second valve, the second valve having a run and a stop position and being connected to the third valve, and the third valve having a forward and a reverse position and being connected with the opposite ends of the working cylinder, manually operable means for shifting the run and stop valve, and a dog adapted during the movement of the support to automatically cause the shifting of one of the other valves.

38. In a machine tool, the combination with a movable support, of a working cylinder, means arranged to deliver motive fluid at a low rate, another means arranged to deliver motive fluid at a high rate, a valve having connections with both means and having a delivery port, said valve in one position serving to conduct fluid from the one means to said port and in the other position from the other means to the same port, and an independently operable companion valve between the working cylinder and the other valve arranged in one position to conduct fluid from the delivery port of the other valve to the working cylinder and in another position to conduct the fluid to an idle discharge port, and a dog adapted during the movement of the support to cause the shifting of one of said valves.

39. In a machine tool, the combination with a movable support, of a working cylinder, means arranged to deliver motive fluid at a low rate, another means arranged to deliver motive fluid at a high rate, a valve having connections with both means and having a delivery port, said valve in one position serving to conduct fluid from the one means to said port and in the other position from the other means to the same port, and a companion valve between the working cylinder and the other valve arranged in one position to conduct fluid from the delivery port of the other valve to the working cylinder and in another position to conduct the fluid to an idle discharge port, manually operable means for shifting the second valve to commence the movement of the movable support, and a dog adapted during the movement of the support to cause the automatic shifting of the other valve.

40. In a machine tool, a movable support, fluid pressure actuated mechanism for moving said support, valve means for controlling fluid pressure to said mechanism for initiating movement of said support, a second valve means for controlling the supply of fluid pressure to said mechanism for changing the rate of movement of the support, a third valve means for controlling the supply of fluid pressure to said mechanism for changing the direction of movement of the support, means for operating said second and said third valve means comprising trip mechanism and dog devices set in motion by the movement of said support for actuating said trip mechanism.

41. In a machine tool having a movable support, the combination of hydraulic transmission mechanism including a source of fluid supply and mechanism movable from fluid supplied therefrom for movement of said support, a first valve means shiftable for abruptly changing the rate at which fluid is supplied to said mechanism, a second valve means shiftable for changing the direction in which fluid is supplied to said mechanism, a plurality of trip mechanisms respectively connected for movement of the respective valve means, and a plurality of dogs respectively adapted during movement of said support to contact and move the respective trip mechanisms.

42. A transmission and control mechanism for machine tools having a movable support, comprising a fluid operable device for movement of said support, a first means for delivering to said device fluid at a relatively low rate and operable for varying said rate, a second means operable for abruptly materially increasing the rate at which fluid is delivered to said device, a third means operable for changing the direction of fluid operation of said device, a manually operable control device for said first means, and a plurality of dog operable control devices respectively for said second and third means, each of said control devices being separately operable.

43. In a machine tool the combination of a reversibly movable support, a transmission for movement of said support including a reversibly fluid operable motor, pump means including a plurality of power actuated unidirectional output pumps, channels for connecting said pump means for actuating said motor in either direction and having another connection operable for disconnecting said motor from both said pumps, valve means associated with said channels and operable for effecting each of said channel connections, and power operable means for operating said valve means at a predetermined point in the movement of said support to effect a change in the connection of said channels for reversing said motor, said power operated means being alternatively operable to effect said other channel connection whereby to disconnect instead of to reverse said motor at said predetermined point.

44. In a machine tool, the combination of a tool support and a work support, one of which is reciprocable with respect to the other, transmission mechanism for movement of said reciprocable support including a cylinder, a piston movable therein, fluid channels, and power driven fluid pump means, said channels and pump means being collectively adapted to supply said cylinder with fluid for movement of said support alternatively in either direction, and alternatively at feed or quick traverse rate in one of said directions, means positively limiting the movement of said support in said direction, control means for said transmission adjustable to vary said feed rate while maintaining said direction of support movement, other control means operable independently of said adjustable means to change the flow of transmission fluid from one end of said cylinder to the other whereby to reverse the movement of said support, and a dog adjustably adapted during support movement in said direction to operate said other control means before the operation of said means positively limiting the movement of said support, said other control means being alternatively operable to stop instead of to reverse said support.

45. In a machine tool, the combination of a tool support and a work support, one of which is movable with respect to the other, a transmission for movement of said movable support including a fluid operable motor connected for said movement of said support, a uni-directional output power driven pump adjustable to change the rate of motor actuation, and channels alternatively connectible between said pump and motor for effecting the one or the other direction of motor movement, and control means for said transmission including means for said adjustment of said pump, valve means for said alternative connection of said channels and operable independently of said pump adjusting means, a trip element connected for movement of said valve means, and a power operated dog movable to contact and shift said trip element during movement of said support.

46. In a machine tool, the combination of a tool support and a work support, one of which is reciprocable with respect to the other, a reversibly fluid operable motor connected with said reciprocable support, power driven fluid pump means, channels for connecting said pump means and motor for either direction of motor operation, shiftable valve means associated with said channels and having a position operative to interrupt the flow of fluid from said pump means to said motor, a trip device operable for movement of said valve means to said position, and a plurality of dogs spaced apart to operate said trip means respectively during the one or the other direction of support movement, whereby to interrupt the movement thereof in either direction.

47. In a machine tool, the combination of a tool support and a work support, one of which is movable with respect to the other, a transmission for said movable support including a fluid operable motor connected therewith and a plurality of power actuated uni-directional output pumps operable for the actuation of said motor alternatively at feed or quick traverse rates, and control means for said transmission including a plurality of devices separably operable respectively for delivery of fluid from said pumps to said motor selectively for the one or the other of said rates, and for reversing the direction of motor actuation relative to the direction of actuation of said pumps.

48. In a machine tool, the combination with a tool support and a work support, one of which is movable with respect to the other, a transmission for said movable support including a fluid operable motor connected therewith and a plurality of power actuated uni-directional output pumps operable for the actuation of said motor alternatively at feed or quick traverse rates, and control means for said transmission including means operable for delivery of fluid from said pumps in said motor selectively for the one or the other of said rates and an independently operable reverser valve positioned in said transmission to be operable to reverse the direction of motor actuation relative to the direction of fluid delivery from each of said pumps.

49. In a machine tool, the combination of a tool support and a work support, one of which is movable with respect to the other, a transmission for movement of said movable support including a fluid operable motor mechanically connected with said support, a uni-directional output feed rate pump having a relatively small volume of fluid delivery and adjustable to change said volume, a uni-directional output quick traverse rate pump having a substantially constant relatively large volume of fluid delivery, and fluid channels differently connectible between said pumps and motor for actuation of said motor selectively at the one or the other of said rates, and control means associated with said transmission and including a first controller for said adjustment of said feed pump, and a second controller separately operable for alternatively effecting said different connections of said channels to move said motor at the feed rate determined by said first controller or at a quick traverse rate.

50. In a machine tool, the combination of a tool support and a work support, one of which is movable with respect to the other, a transmission for movement of said movable support including a reversibly fluid operable motor mechanically connected with said support, pump means including a feed rate pump having relatively small volume of fluid delivery and adjustable to change said volume and a quick traverse rate pump having a relatively large volume of fluid delivery, each of said pumps being of uni-directional output, and fluid channels differently connectible between said pump means and motor for movement of said motor selectively at the one or the other of said rates and selectively in the one or the other direction, and control means associated with said transmission and including a first controller for said adjustment of said feed pump, a second controller for alternatively effecting certain of said different connections of said channels to move said motor at the feed rate determined by said first controller or at a quick traverse rate, and a third controller for alternatively effecting other of said connections of said channels to move said motor in the one or the other direction.

51. In a machine tool, the combination of a tool support and a work support, one of which is movable with respect to the other, a transmission for movement of said movable support including a reversibly fluid operable motor mechanically connected with said support, pump means including a uni-directional flow feed rate pump having relatively small volume of fluid delivery and a uni-directional flow quick traverse rate pump having a relatively large volume of fluid delivery, and channels having connections between said pump means and motor including a connection for changing the direction of motor actuation and a connection for changing the rate thereof, and control means for said transmission including valve means associated with said channels and shiftable for effecting each of said channel connections, and power means for the operation of said valve means including a plurality of relatively adjustable dogs spaced apart and respectively for operation of said valve means to effect different of said channel connections during a uni-directional movement of said support.

52. In a machine tool, the combination of a tool support and a work support, one of which is reciprocable with respect to the other, a fluid operable motor connected for movement of said reciprocable support, a plurality of power operable pumps connectible for the actuation of said motor alternatively at feed or quick traverse rates, a controller shiftable for connecting said pumps to effect the one or the other of said rates during a given direction of support movement, a movable trip device connected for movement of said controller, and a power operated dog adapted during uni-directional movement of said support to contact and move said trip device to effect a change from one to the other of said rates.

53. In a machine tool, the combination of a tool support and a work support, one of which is movable with respect to the other, a fluid operable motor connected for movement of said movable support, a plurality of power operable pumps connectible for the actuation of said motor alternatively at feed or quick traverse rates, control means shiftable for effecting the one or the other of said rates, reverser means operable separately from said control means and shiftable to reverse the direction of motor actuation, a first trip element shiftable for shifting said control means, a second trip element shiftable for shifting said reverser means, and a plurality of power operated dogs adapted during support movement respectively to contact and shift respective of said trip elements.

54. In a machine tool, the combination of a tool support and a work support, one of which is movable with respect to the other, a transmission for said relative movement including a fluid operable motor having a plurality of ports, a relatively small delivery uni-directional output feed rate pump, a relatively large delivery uni-directional output quick traverse pump, each of said pumps having an inlet and an outlet port, first and second fluid channels respectively communicating with the different ports of said motor, third and fourth fluid channels respectively communicating with the different ports of said feed rate pump, and a fifth channel communicating with the outlet port of said quick traverse rate pump, and control means for said transmission including valve means associated with said channels and alternatively operable to effect a closed connection between said first and third channels and a simultaneous closed connection between said second and fourth channels or to connect said fifth channel with one of said first or second channels, whereby to alternatively effect a feed circuit or a quick traverse circuit to actuate said motor, said valve means also being alternatively operable to effect a connection of said channels to stop said motor.

55. In a machine tool, the combination of a tool support and a work support, one of which is movable with respect to the other, a transmission for said relative movement including a reversibly fluid operable motor having a plurality of ports, a feed rate pump having relatively small volume of fluid delivery and adjustable to vary said volume, a quick traverse rate pump having relatively large volume of fluid delivery, each of said pumps being of uni-directional output and each having an inlet and an outlet port, first and second fluid channels respectively connecting with the different ports of said motor, third and fourth fluid channels respectively communicating with the different ports of said feed pump, a fifth channel communicating with the outlet port of said quick traverse pump, and control means for said transmission including valve means associated with said channels and alternatively operable to effect a closed connection between said fifth channel and either of said first or second channels, whereby to effect a quick traverse rate of said motor in either direction or to effect a closed connection between said first and third channels and a simultaneous closed connection between said second and fourth channels, whereby to effect a feed circuit to actuate said motor in one of said directions, and other control means including a controller operable independently of said valve means for the adjustment of said feed pump.

56. In a machine tool, the combination of a tool support and a work support, one of which is movable with respect to the other, a transmission for said relative movement including a reversibly fluid operable motor having a plurality of ports, a feed rate pump for relatively small volume of fluid delivery and adjustable for changing said volume, a quick traverse rate pump for relatively large volume of fluid delivery, each of said pumps being of uni-directional output and each having an inlet and an outlet port, first and second fluid channels respectively communicating with the different ports of said motor, third and fourth fluid channels respectively communicating with the different ports of said feed pump, a fifth channel communicating with the outlet port of said quick traverse pump, and control means for said transmission including valve means alternatively operable to effect a closed connection from said fifth channel to either of said first or second channels or to effect a closed connection from said first to said third channel and a simultaneous closed connection from said second to said fourth channel, power means for the operation of said valve means at predetermined points in the movement of said support including a plurality of relatively adjustable dogs respectively operative for effecting different of said alternative operations of said valve means, and other control means including a controller operable independently of said valve means for the adjustment of said feed pump.

57. In a machine tool, the combination of a tool support and a work support, one of which is reciprocable with respect to the other, means for limiting the movement of said reciprocable support in one direction in said path, a transmission for said relative movement including a reversibly fluid operable motor having a plurality of ports, a feed rate pump for a relatively small volume of fluid delivery, a quick traverse rate pump for a relatively large volume of fluid delivery, each of said pumps being of uni-directional output and each having an inlet and an outlet port, first and second fluid channels respectively communicating with the different ports of said motor, third and fourth fluid channels respectively communicating with the different ports of said feed rate pump, a fifth channel communicating with the outlet port of said quick traverse rate pump, and control means for said transmission including valve means alternatively operable to connect said first or said second channel to receive pump fluid whereby to actuate said motor in different directions, and operable to effect a closed connection from said first to said third channel and a simultaneous closed connection from said second to said fourth channel to effect a feed rate of said motor in one of said directions, and power means for the operation of said valve means during movement of said support including a plurality of relatively adjustable dogs, one of said dogs being adapted to operate said valve means to effect said feed rate at a predetermined intermediate point in the movement of said support and the other of said dogs being adapted to thereafter operate said valve means to change from the one to the other of said alternative channel connections whereby to effect a reversal of said motor at predetermined point in the movement of said support prior to the operation of said means for limiting the movement thereof.

58. In a machine tool, the combination of a tool support and a work support, one of which is movable with respect to the other, a transmission for said relative movement including a reversibly fluid operable motor having a plurality of ports, a uni-directional output feed rate pump for relatively small volume of fluid delivery and adjustable for changing said volume, a uni-directional output quick traverse rate pump for relatively large volume of fluid delivery, each of said pumps having an outlet and an inlet port, and channels connectible between said ports for the actuation of said motor in either direction and from said feed rate pump exclusive of said quick traverse rate pump in one of said directions, the last connection being such that the inlet port of said feed rate pump is connected to receive from one of said motor ports through a substantially closed passage, and control means for said transmission including means adjustable for said adjustment of said feed pump, valve means operable independently of said feed pump adjusting means and operable to effect each of said channel connections, and a plurality of dogs respectively adapted during movement of said support to operate said valve means to effect different of said channel connections.

59. In a machine tool, the combination of a tool support and a work support, one of which is reciprocable with respect to the other, a transmission for movement of said reciprocable support including a reversibly fluid operable motor having a plurality of ports, a feed rate pump for a relatively small volume of fluid delivery, a quick traverse rate pump for a relatively large volume of fluid delivery, each of said pumps being of uni-directional output and each having an inlet and outlet port, first and second fluid channels respectively communicating with the different ports of said motor, third and fourth fluid channels respectively communicating with the different ports of said feed rate pump, a fifth channel communicating with the outlet port of said quick traverse rate pump, and control means for said transmission including valve means operable to effect a closed connection from said first to said third channel and a simultaneous closed connection from said second to said fourth channel whereby to effect a feed rate fluid circuit, and operable for alternatively connecting the one or the other of said first and second channels to receive pump fluid whereby to effect a reversal of motor actuation, and power operable means for the operation of said valve means during movement of said support including a plurality of relatively adjustable dogs, one of said dogs being adapted to operate said valve means to effect said feed circuit at a predetermined intermediate point in the movement of said support and the other of said dogs being adapted to operate said valve means to effect said motor reversal, said power operable means being alternatively operable for effecting a connection of said channels to stop said motor instead of effecting said reversal thereof.

60. In a machine tool organization, the combination of a reciprocable element, an hydraulic motor for reciprocating said element including a cylinder and a piston therein, means for supplying pressure fluid at a feed rate, means for supplying fluid at a rapid traverse rate, valve means controlling the flow of said pressure fluid selectively to either end of said cylinder, a plurality of electromagnets arranged to actuate said valve means and energizable in different combinations to initiate or interrupt the flow of fluid to said cylinder and cause said element to be advanced at feed or rapid traverse rates or to be rapidly retracted, and dog operated switch mechanism actuated in response to movement of said element and controlling the selective energization of said magnets to define an automatic cycle of feed and rapid traverse motions.

61. In a machine tool organization, the combination of a reciprocable element, an hydraulic motor for reciprocating said element including a cylinder and a piston therein, means for supplying pressure fluid at feed and rapid traverse rates, valve means controlling the flow of said fluid selectively to opposite ends of said cylinder, a plurality of electromagnets arranged to actuate said valve means and energizable selectively to control the flow of fluid to said cylinder and cause said element to be advanced at feed or rapid traverse rates or to be rapidly retracted, and switch mechanism actuated in response to movement of said element and controlling the selective energization of said magnets to define an automatic cycle of feed and rapid traverse motions.

EVERETTE K. MORGAN.

CERTIFICATE OF CORRECTION.

Patent No. 2,051,052.  August 18, 1936.

EVERETTE K. MORGAN.

It is hereby certified that error appears in the printed specification o the above numbered patent requiring correction as follows: Page 3, first column, line 22, and page 5, second column, line 54, claim 15, for the word "valve" read valves; page 7, first column, lines 53 and 59, claims 30 and ; respectively, for the claim reference numeral "25" read 29; page 9, first column, line 65, claim 48, for "in" read to; and that the said Letters Pate should be read with these corrections therein that the same may conform to t record of the case in the Patent Office.

Signed and sealed this 17th day of November, A. D. 1936.

Henry Van Arsdale (Seal)  Acting Commissioner of Patents.